H. H. TAYLOR.
GEARING.
APPLICATION FILED APR. 1, 1908.
948,801.
Patented Feb. 8, 1910.
2 SHEETS—SHEET 1.
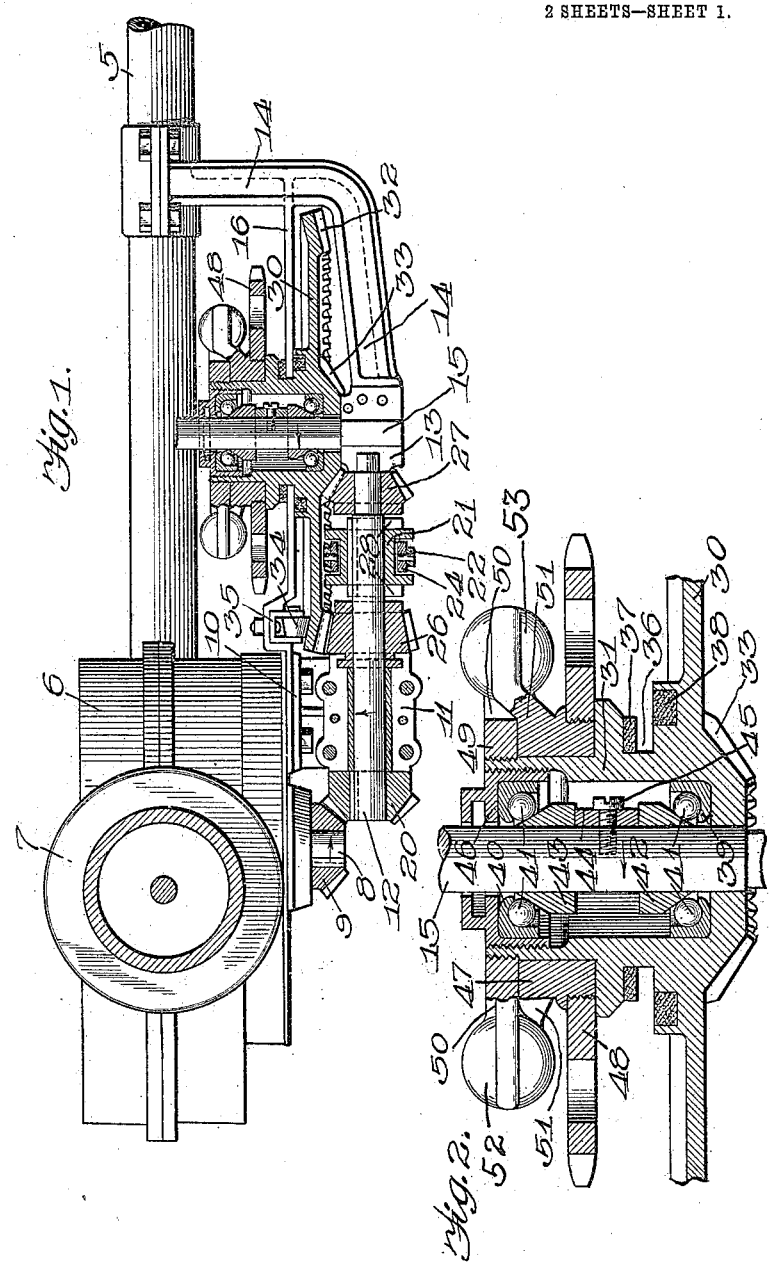

H. H. TAYLOR.
GEARING.
APPLICATION FILED APR. 1, 1908.
948,801.
Patented Feb. 8, 1910.
2 SHEETS—SHEET 2.
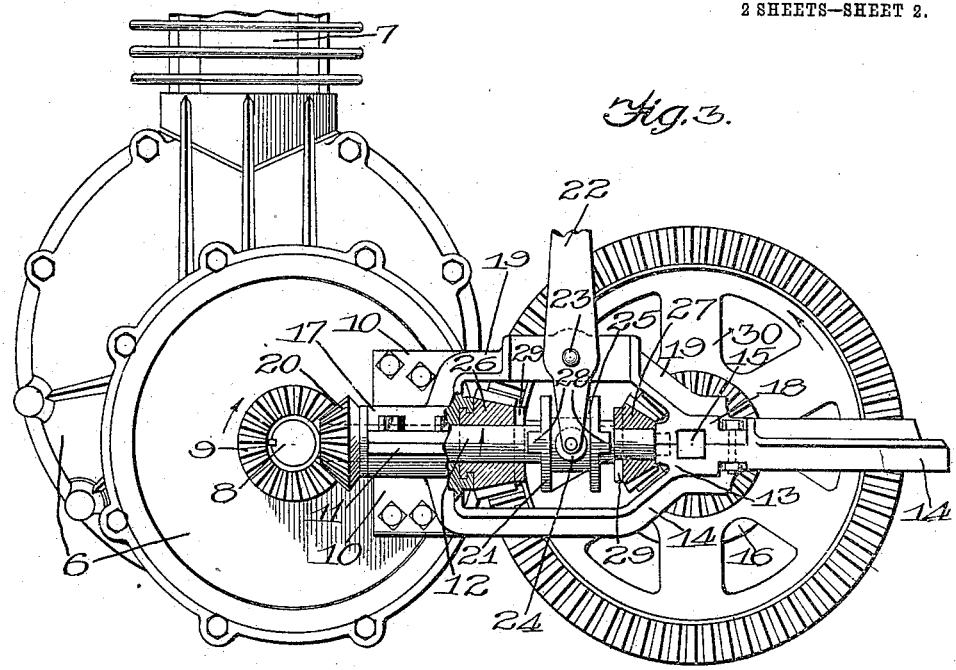

UNITED STATES PATENT OFFICE.

HORACE H. TAYLOR, OF SAN JOSE, CALIFORNIA.

GEARING.

948,801.  Specification of Letters Patent.  Patented Feb. 8, 1910.

Application filed April 1, 1908. Serial No. 424,585.

*To all whom it may concern:*

Be it known that I, HORACE H. TAYLOR, a citizen of the United States, residing at San Jose, county of Santa Clara, State of California, have invented certain new and useful Improvements in Gearing, of which the following is a specification, reference being had to the accompanying drawings.

My invention relates to improvements in motor cycles, and particularly to the transmission mechanism, and its principal object is to provide a new form of transmission mechanism by which the motor cycle may have more than one speed in order to insure the climbing of steep grades with a normal supply of fuel and with a minimum strain upon the engine.

A further object is to dispense with the friction rings and compensating sprocket wheels as now used on motor cycles and to provide for positive driving by the engine, and to provide means for taking up the jar and shock from the engine incident to positive driving.

It has further for an object to provide a transmission mechanism by the use of which the operator may stop or start the engine independently of the forward movement of the motor cycle.

In the drawings:—Figure 1 is a top or plan view of my improved transmission mechanism shown in position on one of the bars of a motor cycle, having the upper portion of the framework removed, and with various parts in cross-section. Fig. 2 is an enlarged detail, being a view of part of that shown in Fig. 1. Fig. 3 is a side elevation of the parts shown in Fig. 1, partly broken away, and with the addition of the upper portion of the framework, some parts being shown in cross-section. Fig. 4 is a rear view of the parts shown in Fig. 2.

5 indicates one of the tubular frame rods of a motor cycle.

6 indicates the crank-case and 7 the cylinder (partly broken away in Fig. 3) of the engine, such parts being secured in position on the motor cycle in any suitable manner.

8 indicates the drive shaft of the engine having keyed upon it a bevel gear 9.

10 indicates a plate bolted or otherwise secured to the crank-case 6, projecting vertically from the outer face of which is a bearing plate 11 which forms the lower half of a journal box in which a shaft 12 is mounted.

13 indicates the lower half of a bearing-block carried by an arm 14 which extends from the bearing plate 11 below the shaft 12, the end of the shaft 12 being journaled in said bearing-block.

15 indicates an axle non-rotatably mounted at one end in the bearing-block 13, its other end being supported in any appropriate well-known manner from the frame of the motor cycle. As best shown in Fig. 1, the arm 14 turns at a point some distance beyond the bearing-block 13 toward the bar 5 to which it is attached in any suitable manner.

16 indicates another arm extending from the plate 10 in the same direction that the arm 14 extends and connected at its end to the arm 14, said arm 16 being given a downward curve to avoid contact with the axle 15, as hereinafter described. In the construction shown, the plates 10 and 11, the bearing-block 13, and the arms 14 and 16 are formed integral, but they may be secured together, of course, in any other suitable manner.

17 indicates a cap bolted or otherwise suitably secured to the bearing plate 11, the two parts 11 and 17 forming an ordinary journal bearing.

18 indicates a cap bolted or otherwise secured to the bearing-block 13, the parts 13 and 18 forming a journal bearing for the end of the shaft 12 and non-rotatably securing in position one end of the axle 15.

19 indicates an arm secured at its ends to the caps 17 and 18, which, in the construction shown, is formed integral with such caps.

20 indicates a bevel gear keyed or otherwise suitably secured upon the end of the shaft 12 and meshing with the bevel gear 9.

21 indicates a clutch member keyed or otherwise secured upon the shaft 12 so as to rotate therewith but to be slidable longitudinally thereon.

22 indicates a shift-bar of the ordinary construction pivoted at 23 on the arm 19 by means of which the clutch member 21 may be moved longitudinally on the shaft 12, each arm of the yoke of said shift-bar being provided with the usual roller 24, which rollers operate in a circumferential groove 25 in the clutch member 21 in the usual manner.

26 indicates a bevel gear loosely mounted on the shaft 12 between the clutch member 21 and the bearing plate 11, and 27 indicates a bevel gear loosely mounted on said shaft between the clutch member and the bearing-block 13. As shown in Figs. 1 and 3, the journal bearing 11—17 of the shaft 12 serves also as a bearing for the gear 26 at one of its ends, the gear and journal-bearing being suitably grooved to prevent movement of the gear 26 longitudinally on the shaft. The gear 27 is guarded against longitudinal movement along the shaft 12 toward the clutch member 21 by said shaft's being diminished in size somewhat to receive said gear 27.

28 indicates lugs, one on each end of the clutch member 21.

29 indicates notches in the ends of the gears 26 and 27 adjacent to the clutch member 21, said notches being of such size as to readily receive the lug 28 thereby locking together said clutch member 21 and said gear 26 or 27, as the case may be, when said clutch member 21 is slid along the shaft 12 by means of the shift-bar 22, so that said clutch member and said gear are caused to rotate together, as will be readily understood. The shift-bar 22 may be held in its various adjusted positions in any suitable manner.

30 indicates a gear wheel which, in the construction shown, is integral with the hub 31 mounted upon the axle 15 upon ordinary ball bearings hereinafter described. Said gear wheel 30 is provided with a gear 32 meshing with the gear 26 on the shaft 12, and with a gear 33 meshing with the gear 27 on said shaft.

34 indicates a beveled roller suitably journaled in a yoke 35 which is bolted or otherwise suitably secured to the arm 16 in such position that said roller contacts the gear wheel 30 on its rear face thus maintaining the gear 32 in proper positive engagement with the gear 26.

36 indicates a peripheral groove in the hub 31 which groove engages the arm 16.

37 indicates a washer of felt or other suitable material adapted to be saturated with oil or other lubricant, said washer 37 occupying a part of the groove 36 at one side of the arm 16. The gear wheel 30 is provided with an annular groove adapted to be filled with a similar washer 38.

Referring to the bearings for the hub 31, inasmuch as these bearings are of ordinary construction, it is not thought to be necessary to describe them other than to point out the various parts.

Referring particularly to Fig. 2, 39—40 indicate ball-retaining washers provided with suitable balls 41 which bear against tapered bearings 42—43 which are spaced apart on the axle 15 by the block 44 suitably held in place by a screw 45. The retaining washer 39 is mounted in the hub 31, while the retaining washer 40 is mounted in a cap 46 screwed into the end of the hub 31 by means of which the bearings may be adjusted and regulated as will be readily understood.

Referring further to Fig. 2, 47 indicates a sleeve journaled on the hub 31. 48 indicates a sprocket wheel screw-threaded upon the sleeve 47 so as to rotate positively therewith when said sleeve is rotated in the direction indicated by the arrow across the spindle 15 in Fig. 2. This sprocket wheel 48 is adapted to be connected up in any suitable manner to positively drive the motor cycle. 49 indicates a collar screw-threaded upon the hub 31 so as to rotate positively therewith when said hub is rotated in the direction indicated by the arrow in Fig. 2. 50 indicates two arms extending radially from the collar 49 at diametrically opposite points, and 51 indicates two arms likewise extending radially from the sleeve 47. As best shown in Fig. 2, the arms 51 are curved to register with the arms 50. As shown in Fig. 4, the arms 50 are provided with caps 52 and the arms 51 with caps 53, said arms and caps preferably being formed integral. 54 indicates heavy spiral springs firmly secured at their ends in any suitable manner to the oppositely disposed caps 52—53. If in the operation of the machine it is found that the springs 54 have a tendency to buckle, such buckling may be prevented in any well-known suitable manner.

The operation of the device is as follows:—With the sprocket wheel 48 properly connected with the drive-wheel of the motor cycle, the engine is started in operation, driving the gear 9 in the direction indicated by the arrow adjacent thereto, driving the shaft 12 and clutch 21 in the direction indicated by the arrow on said shaft. The shift-bar 22 is then moved in one direction or the other, locking the clutch member 21 with gear 26 or gear 27 as the case may be, causing a rotation of the gear wheel 30 in the direction indicated by the arrow on said gear wheel in Fig. 3. It will be understood, of course, that if it is muddy or if the operator is ascending a hill or desires for any other reason to go comparatively slow, the clutch member 21 will be locked with the gear 26, thereby giving the gear wheel 30 a relatively slow speed of rotation, the gear 27 offering no material resistance to such rotation on account of being loose on the shaft 12. If, however, the forward movement of the motor cycle is comparatively easy and it is desired to go as rapidly as possible or as rapidly as is compatible with a reasonable consumption of power, the clutch member 21 will be locked with the gear 27, as will be readily understood.

With the gear wheel 30 rotating in the direction indicated in Fig. 3, the hub 31 will be rotated in the direction indicated by the arrow in Fig. 4, carrying with it the collar 49. Through the compression springs 54, this motion is transmitted to the sleeve 47 and sprocket wheel 48. It is thus seen that whatever motion is transmitted to the sprocket wheel 48 is transmitted through the compression springs 54 whereby the jar and shock incident to starting the engine or to changing from the low speed to the high speed are taken up, relieving the strain upon the mechanism as a whole and greatly increasing the comfort and pleasure of riding.

While I have described the shaft 12 as being provided with two gears loosely mounted thereon with a clutch member mounted between them, it will be understood that a greater number of gears may be so mounted on said shaft, and an additional clutch member or clutch members provided for locking them to the shaft, preferably providing the gear wheel 30 with additional gears to mesh with additional gears on the shaft. It is likewise evident that the collar 49 and sleeve 47 might be provided with a different number of arms 50—51 and caps 52—52, and a corresponding number of springs 54 inserted without departing from my invention.

I also wish it to be understood that while I have described specifically the embodiment of the invention illustrated in the accompanying drawings, I do not restrict myself to the specific construction described, as my invention includes, generically, the subject-matter of the broader claims.

While I have not shown a casing about the gear-wheel 30 and the clutch mechanism co-acting therewith, it will be understood that such casing may be attached in any suitable manner to the framework, or, if preferred, one side of the casing may be substituted for the arm 16, being secured in place in any suitable manner, the yoke 35 being then secured upon the interior of such casing. One side of the upper portion of such casing may of course be set down into the groove 36 from above, thus forming a tightly closed chamber to keep out dust, etc.

What I claim as my invention and desire to secure by Letters Patent is:—

1. In a motor cycle transmission mechanism, the combination of an engine crank-case, a shaft journaled therein, a bevel gear keyed on said shaft, a shaft extending at right angles to said engine shaft, a bevel gear keyed thereon and meshing with said first-mentioned bevel gear, a bearing part for supporting one end of said second shaft rigidly secured to said crank-case, a bearing part for the other end of said second shaft, a connecting arm formed integral with said two bearing parts, a spindle secured at one end in said second bearing part, caps secured to said bearing parts, a connecting arm formed integral with said two caps, a gear-wheel revolubly mounted on said spindle and provided with two concentric sets of gear teeth, two bevel gears revolubly mounted upon said second shaft and meshing respectively with said gears on said gear-wheel, means for holding said last-named two bevel gears against movement longitudinally of said second shaft, a clutch feathered on said second shaft intermediate said two bevel gears on said shaft and adapted to revolve independently of said two bevel gears or to engage either one of them, a lever pivoted on the arm connecting said two caps and adapted to move said clutch into engagement with either one of said two bevel gears revoluble on said second shaft, and means connected with said gear-wheel for transmitting power therefrom.

2. In combination, a shaft 12, a gear non-rotatably mounted thereon, a gear-wheel revoluble relative to said shaft mounted adjacent thereto, a second gear mounted revolubly relative to said gear-wheel, springs mounted on said gear-wheel and adapted to cause said second gear to rotate yieldingly with said gear-wheel, and positively-acting variable speed transmission devices interposed between and connected positively with said shaft and said gear-wheel.

3. In combination, a shaft 12, a gear non-rotatably mounted thereon, a gear-wheel revoluble relative to said shaft mounted adjacent thereto, a second gear revolubly mounted on the hub of said gear-wheel, springs adapted to cause said second gear to rotate yieldingly with said gear-wheel, and positively-acting variable-speed transmission devices interposed between and connected positively with said shaft and said gear-wheel.

HORACE H. TAYLOR.

Witnesses:
IRA LILLICK,
E. B. CORELBA.